United States Patent
Sato et al.

(10) Patent No.: US 11,353,837 B2
(45) Date of Patent: Jun. 7, 2022

(54) COMMUNICATION DEVICE

(71) Applicant: FUJITSU LIMITED, Kawasaki (JP)

(72) Inventors: Hiroyuki Sato, Kawasaki (JP); Hiroyuki Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 17/014,719

(22) Filed: Sep. 8, 2020

(65) Prior Publication Data

US 2020/0401096 A1 Dec. 24, 2020

Related U.S. Application Data

(62) Division of application No. 16/270,380, filed on Feb. 7, 2019, now Pat. No. 10,838,382.

(30) Foreign Application Priority Data

Feb. 28, 2018 (JP) .............................. JP2018-034499

(51) Int. Cl.
*G05B 19/042* (2006.01)
*H01H 37/00* (2006.01)

(52) U.S. Cl.
CPC .... *G05B 19/042* (2013.01); *G05B 2219/2639* (2013.01); *H01H 37/00* (2013.01); *Y02E 10/50* (2013.01); *Y02E 10/56* (2013.01)

(58) Field of Classification Search
CPC .......... G05B 19/042; G05B 2219/2639; H01H 37/00; Y02E 10/50; Y02E 10/56
See application file for complete search history.

(56) References Cited

U.S. PATENT DOCUMENTS

| 9,101,011 | B2 | 8/2015 | Sawada et al. |
|---|---|---|---|
| 2006/0164040 | A1 | 7/2006 | Ohkubo |
| 2010/0043870 | A1 | 2/2010 | Bennett et al. |
| 2018/0270632 | A1* | 9/2018 | Kaneeda ................ G08C 17/02 |

FOREIGN PATENT DOCUMENTS

| JP | 62-24997 U1 | 2/1987 |
|---|---|---|
| JP | 62-41349 U1 | 3/1987 |
| JP | 2006-204024 A | 8/2006 |
| JP | 2008-289236 A | 11/2008 |
| WO | WO-2015/115654 A1 | 8/2015 |

OTHER PUBLICATIONS

Communication from Japanese Patent Office in counterpart Application No. 2018-034499, dated Aug. 31, 2021.

* cited by examiner

*Primary Examiner* — Daniel Cavallari
(74) *Attorney, Agent, or Firm* — ArentFox Schiff LLP

(57) ABSTRACT

A power supply control device includes: a power generator that converts energy into power; an environmental sensor that detects a state of an ambient environment; and a controller that controls an operation timing of a functional circuit that operates upon receipt of power supplied from the power generator based on the state of the ambient environment detected by the environmental sensor.

9 Claims, 14 Drawing Sheets

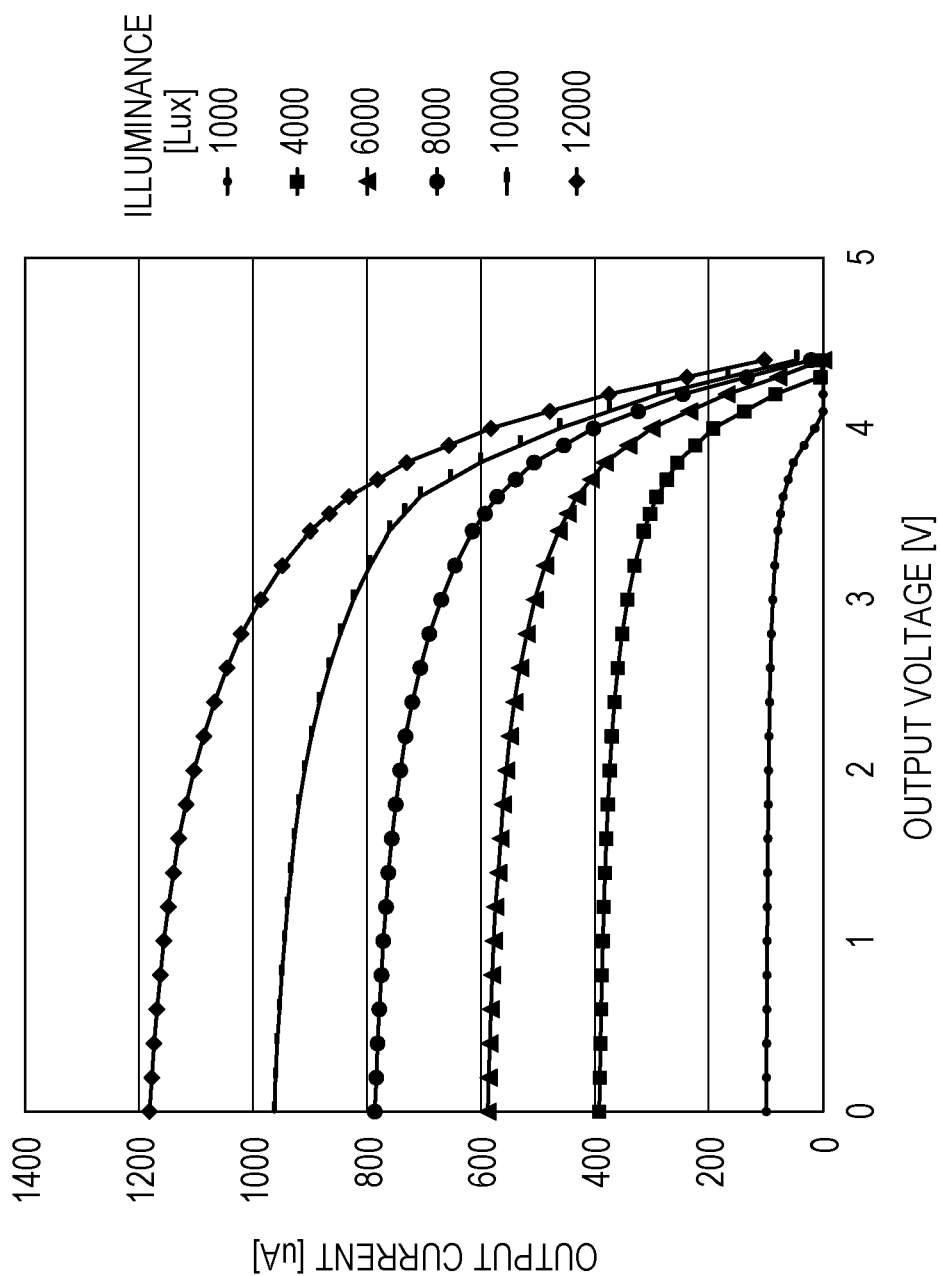

COMMUNICATION DEVICE

CROSS-REFERENCE TO RELATED APPLICATION

This application is a divisional of and claims the benefit of priority of U.S. patent application Ser. No. 16/270,380, filed Feb. 7, 2019, which in turn claims priority to Japanese Patent Application No. 2018-34499, filed on Feb. 28, 2018, the entire contents of each of which are incorporated herein by reference.

FIELD

The disclosed technology relates to a power supply control device and a communication device.

BACKGROUND

For example, the use control of power obtained by a power generation element such as a solar cell is performed.

Related art is disclosed in Japanese Examined Utility Model (Registration) Application Publication No. 62-24997, Japanese Laid-open Patent Publication No. 2006-204024 and Japanese Unexamined Utility Model (Registration) Application Publication No. 62-041349.

SUMMARY

According to an aspect of the embodiments, a power supply control device includes: a power generator that converts energy into power; an environmental sensor that detects a state of an ambient environment; and a controller that controls an operation timing of a functional circuit that operates upon receipt of power supplied from the power generator based on the state of the ambient environment detected by the environmental sensor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 1A is a graph illustrating an example of an output characteristic of a solar cell when illuminance of light applied to the solar cell is changed;

DESCRIPTION OF EMBODIMENTS

For example, there is known a power supply device including a solar cell, a main battery, and a control circuit that intermittently supplies a battery voltage to an equipment and controls a time interval at which the battery voltage is supplied to the equipment. In this power supply device, the control circuit supplies a battery voltage to the equipment from the main battery when a voltage of the solar cell reaches a certain level or lower, and performs control to increase the time interval when the voltage of the solar cell reaches the certain level or reaches the certain level or lower.

There is known a power supply control method in which a generator and a battery are prepared as a power supply of an electronic equipment in which a standby state and an operating state may be switched, the method including supplying power from the generator when power may be supplied from the generator, and supplying power from the battery when power may not be supplied from the generator. In this method, when the power supply is continuously performed by the battery and then a predetermined period of time elapses, an operation mode of the electronic equipment is set to the standby state, and when the power supply by the generator becomes possible, the operation mode is returned to a normal operation.

There is known a photovoltaic power generation system having a control circuit that, when a solar cell generates power, intermittently charges a secondary battery while intermittently supplying power from a solar cell to a load. In this photovoltaic power generation system, when the solar cell does not generate power and a charging voltage of the secondary battery is a predetermined voltage or higher, the control circuit intermittently supplies power from the secondary battery to the load.

In recent years, development of a sensor node operated by power obtained by environmental power generation has been advanced. Power obtained by a power generation element such as a solar cell is very weak, and further a power generation amount fluctuates with the change of the environment. For this reason, stable supply of power is a problem in the development of a sensor node. In order to realize a stable power supply, it is also conceivable to accumulate the surplus of power generated by the power generation element in a storage element.

Figure 1B:
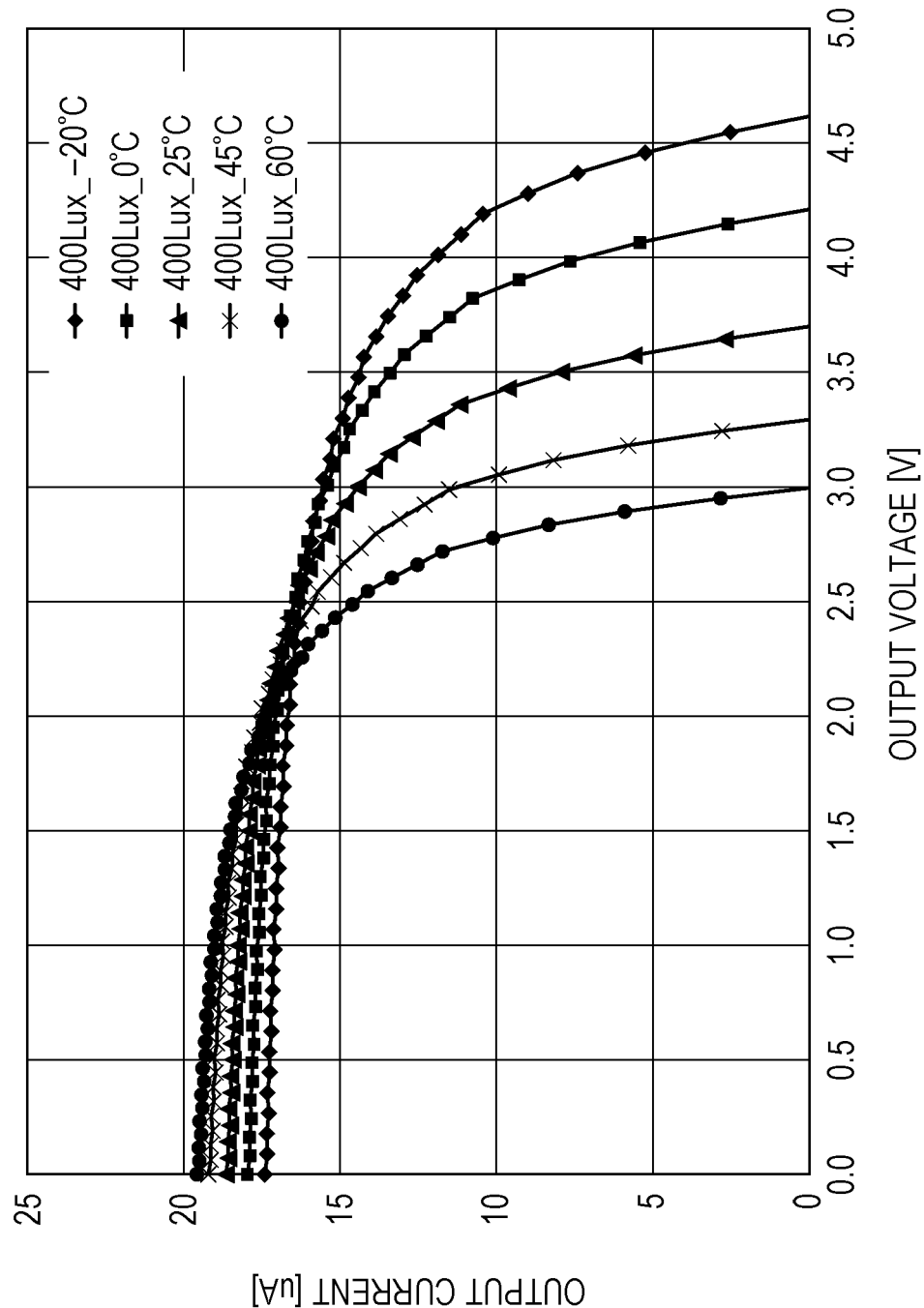
FIG. 1B is a graph illustrating an example of the output characteristic of the solar cell when an ambient temperature is changed.

FIG. 1A is a graph illustrating an example of an output characteristic of a solar cell when illuminance of light applied to a solar cell which is an example of a power generation element is changed. FIG. 1B is a graph illustrating an example of the output characteristic of the solar cell when an ambient temperature is changed. As illustrated in FIG. 1A and FIG. 1B, the output characteristic (power generation performance) of the solar cell fluctuates according to ambient illuminance and temperature.

Figure 2:
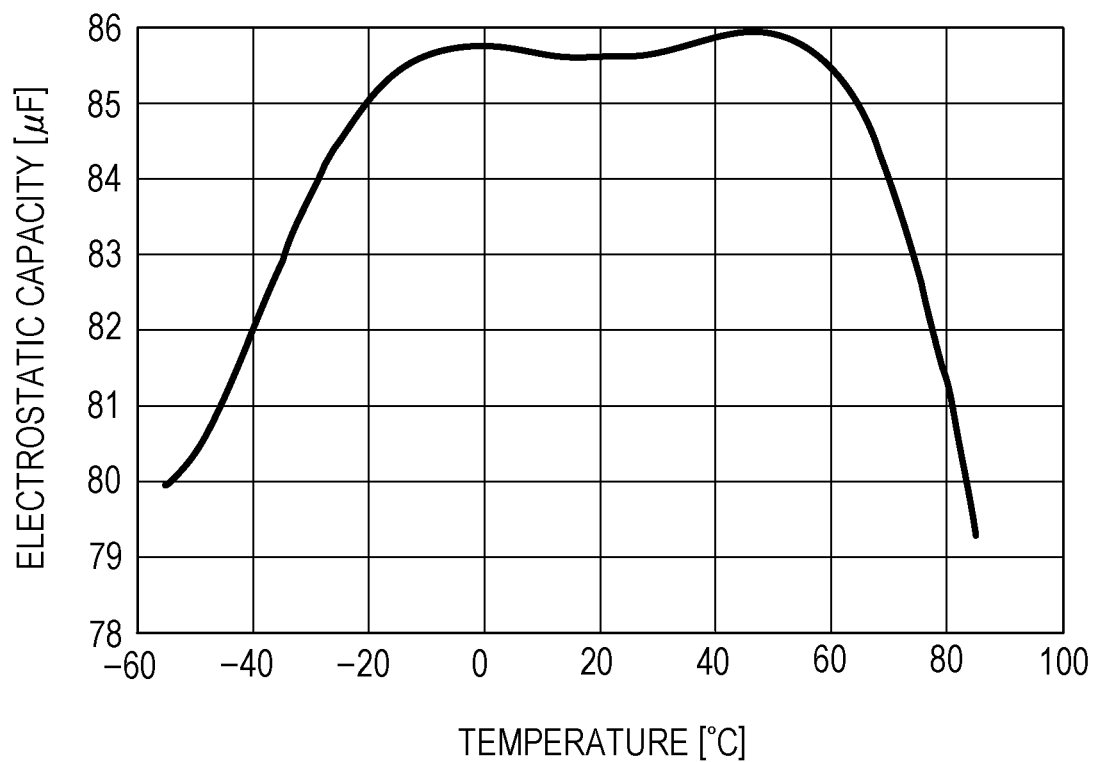
FIG. 2 is a graph illustrating an example of a temperature characteristic of an electrostatic capacity of a capacitor.

On the other hand, FIG. 2 is a graph illustrating an example of a temperature characteristic of an electrostatic capacity of a capacitor which is an example of a storage element. As illustrated in FIG. 2, the electrostatic capacity (storage performance) of the capacitor fluctuates according to the ambient temperature.

In this manner, a power generation performance of the power generation element and a storage performance of the storage element fluctuate according to an ambient environment. Therefore, when a usage mode of the power that has been generated or stored is fixed irrespective of the ambient environment, there is a risk that the sensor node may become inoperable for a long time due to insufficient power and planned data collection using sensor nodes becomes difficult.

In one aspect, the disclosed technology aims to appropriately use power generated in a power generation unit in a system including the power generation unit.

Hereinafter, embodiments of the present invention will be described with reference to the drawings. In each of the drawings, the same or equivalent constituent elements and parts are given the same reference numerals, and redundant explanation will be omitted as appropriate.

First Embodiment

Figure 3A:
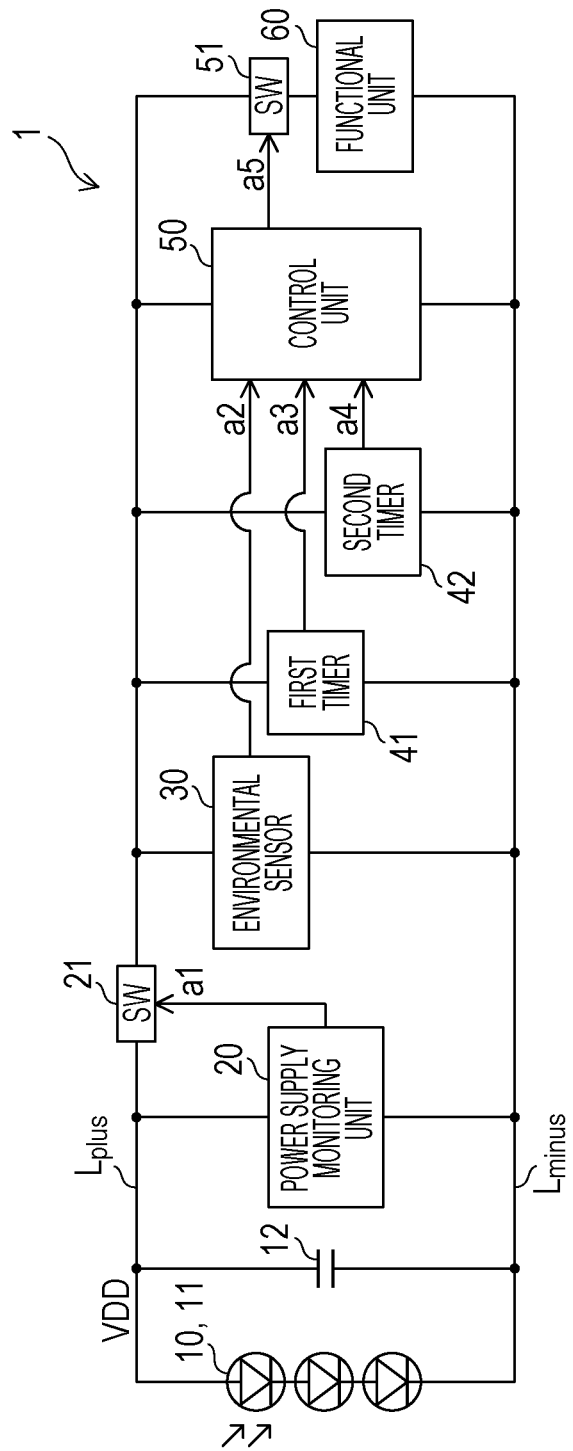
FIG. 3A is a diagram illustrating an example of a configuration of a power supply control device according to a first embodiment of the disclosed technology.

FIG. 3A is a diagram illustrating an example of a configuration of a power supply control device 1 according to a first embodiment of the disclosed technology.

The power supply control device 1 includes a power generation unit 10, a capacitor 12, a power supply monitoring unit 20, an environmental sensor 30, a first timer 41, a second timer 42, a control unit 50, and switches 21 and 51. In FIG. 3A, a functional unit 60 that operates with power supplied from the power supply control device 1 is illustrated together with the power supply control device 1.

The power generation unit 10 converts energy such as light, heat, vibration, radio waves and the like into power and outputs a generated voltage. Hereinafter, a case where a solar cell 11 is used as the power generation unit 10 will be described as an example, but it is also possible to use, as the power generation unit 10, a power generation element other than the solar cell.

The solar cell 11 has a positive electrode coupled to a power supply line $L_{plus}$ on a positive side, and a negative electrode coupled to a power supply line $L_{minus}$ on a negative side. The power supply line $L_{minus}$ on the negative side may be a ground line. The generated voltage output from the solar cell 11 is applied to the power supply lines $L_{plus}$ and $L_{minus}$.

The switch 21 is provided on the power supply line $L_{plus}$. The switch 21 is turned on or off in accordance with a control signal a1 supplied from the power supply monitoring unit 20. The switch 21 divides the power supply line $L_{plus}$ into a solar cell side and a load side.

The capacitor 12 is connected in parallel to the solar cell 11. For example, the capacitor 12 has one electrode coupled to the power supply line $L_{plus}$ on the solar cell side, and the other electrode coupled to the power supply line $L_{minus}$. The capacitor 12 accumulates power generated by the solar cell 11.

The power supply monitoring unit 20 controls on/off of the switch 21 based on a level of a voltage VDD generated between the power supply line $L_{plus}$ on the solar cell side and the power supply line $L_{minus}$. When the level of the voltage VDD exceeds a level of a threshold voltage VH1, the power supply monitoring unit 20 outputs the control signal at for turning on the switch 21. The level of the threshold voltage VH1 is set to a voltage level at which all of the environmental sensor 30, the first timer 41, the second timer 42, the control unit 50, and the functional unit 60 may operate. On the other hand, when the level of the voltage VDD is equal to or lower than the level of a threshold voltage VL1 (VH1), the power supply monitoring unit 20 outputs the control signal at for turning off the switch 21.

The functional unit 60 includes at least one circuit block having a predetermined function and operates upon receipt of power supplied from the solar cell 11. The functional unit 60 may include, for example, a sensor constituting a sensor node and a wireless communication circuit (none of which are illustrated).

The switch 51 is provided on a power supply path for supplying power to the functional unit 60. For example, the switch 51 and the functional unit 60 are coupled in series. A series circuit including the switch 51 and the functional unit 60 is coupled in parallel to the solar cell 11. The switch 51 is turned on or off in accordance with a control signal a5 supplied from the control unit 50. When both of the switches 21 and 51 are turned on, the functional unit 60 is coupled to the solar cell 11, and operates upon receipt of power supplied from the solar cell 11. The switch 51 is not entirely required as long as the functional unit 60 has an ON/OFF function. In that case, the control unit 50 directly controls the functional unit 60.

The environmental sensor 30 is a sensor that detects a state of an ambient environment of the power supply control device 1. As the environmental sensor 30, for example, at least one of an illuminance sensor and a temperature sensor may be used. The environmental sensor 30 outputs a detection signal a2 indicating a state of the detected ambient environment. The detection signal a2 output from the environmental sensor 30 is supplied to the control unit 50.

The first timer 41 outputs a timing signal a3 at a period T1. The second timer 42 outputs a timing signal a4 at a period T2 longer than the period T1. Each of the timing signals a3 and a4 is supplied to the control unit 50.

The control unit 50 selects one of the timing signals a3 and a4 based on the detection signal a2 and outputs the control signal a5 for turning on the switch 51 in synchronization with the selected timing signal. For example, the control unit 50 turns on the switch 51 at intervals corresponding to the selected timing signal. The control unit 50 may have a configuration of a microcontroller including a central processing unit (CPU), a memory, and an input/output unit, for example.

The environmental sensor 30, the first timer 41, the second timer 42, and the control unit 50 are connected to the power lines $L_{plus}$ and $L_{minus}$ on the load side. When the switch 21 is turned on, the environmental sensor 30, the first timer 41, the second timer 42, and the control unit 50 are connected to the solar cell 11, and operate upon receipt of power supplied from the solar cell 11.

Figure 3B:
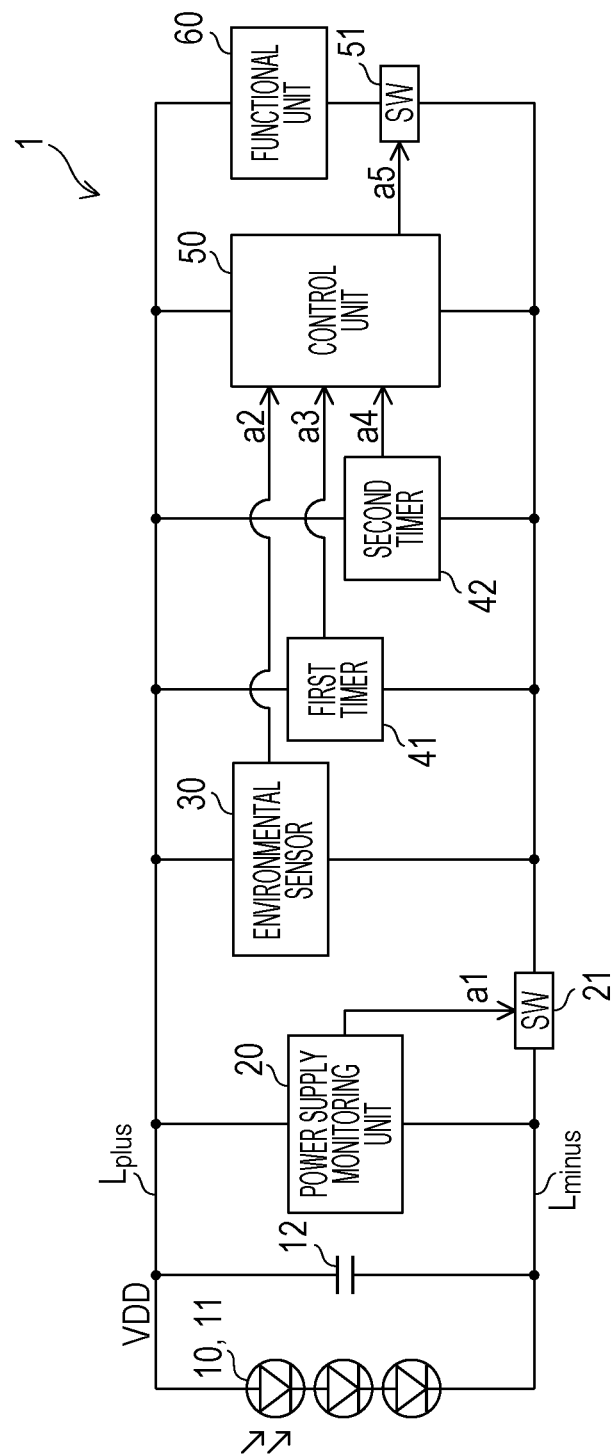
FIG. 3B is a diagram illustrating an example of a configuration of the power supply control device according to the first embodiment of the disclosed technology.

As illustrated in FIG. 3B, it is also possible to change the arrangement of the switch 21 and the switch 51. In the example illustrated in FIG. 3B, the switch 21 is provided on the power supply line $L_{minus}$, and the switch 51 is provided between the power supply line $L_{minus}$ and the functional unit 60.

The operation of the power supply control device 1 will be described below. In the initial state, it is assumed that the switches 21 and 51 are turned off.

When the solar cell 11 is irradiated with light, power is generated in the solar cell 11. The power generated by the solar cell 11 is accumulated in the capacitor 12. As the illuminance of the light applied to the solar cell 11 increases, the generation voltage (charging voltage of the capacitor 12) output from the solar cell 11 increases, and the level of the voltage VDD generated in the power supply lines $L_{plus}$ and $L_{minus}$ increases. When detecting that the level of the voltage VDD exceeds the level of the threshold voltage VH1, the power supply monitoring unit 20 outputs the control signal at for turning on the switch 21. As a result, the switch 21 is turned on, power is supplied to the environmental sensor 30, the first timer 41, the second timer 42, and the control unit 50, and each of these blocks is activated.

Figure 4:
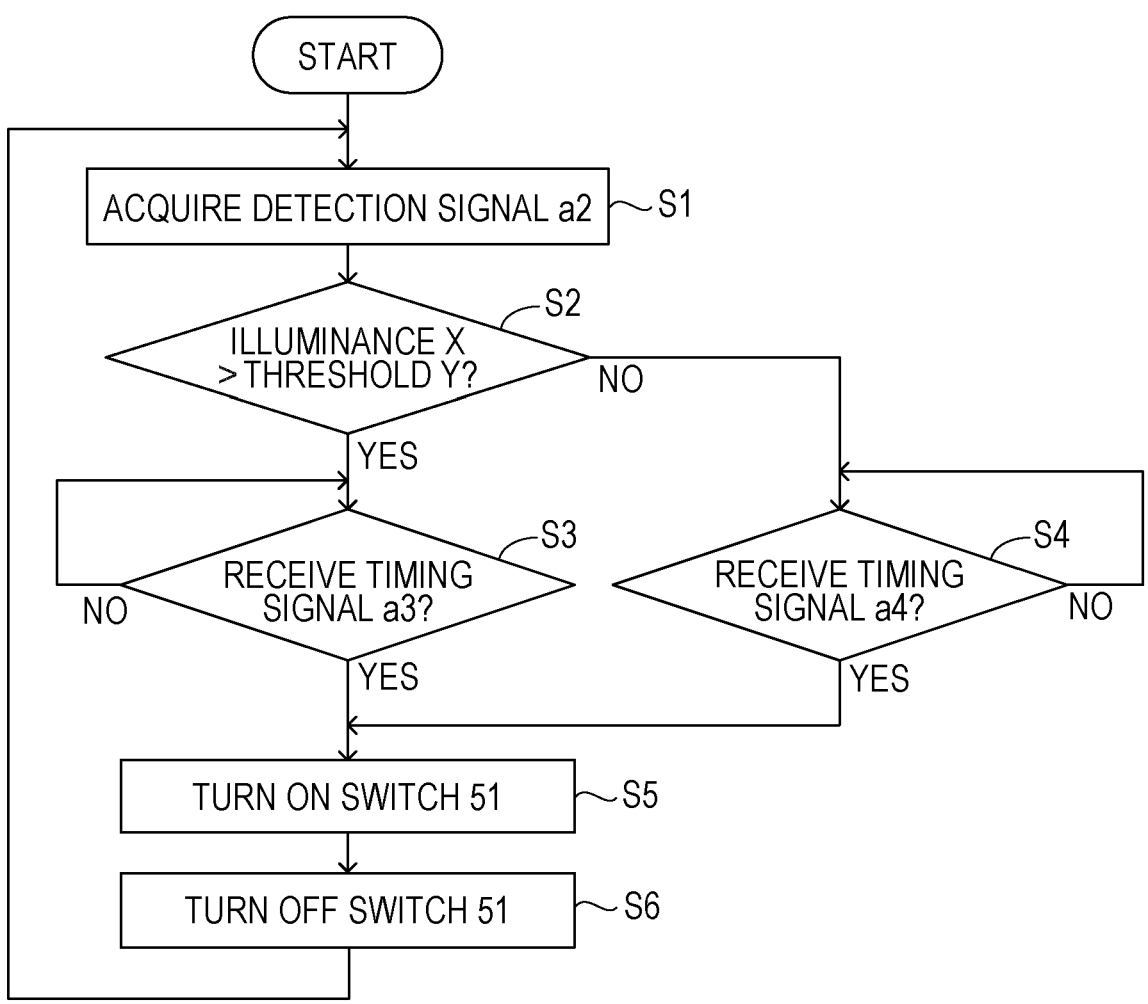
FIG. 4 is a flowchart illustrating an example of a flow of processing performed in a control unit according to the first embodiment of the disclosed technology.

FIG. 4 is a flowchart illustrating an example of the flow of processing executed by the control unit 50. Here, a case where the environmental sensor 30 is an illuminance sensor, the functional unit 60 includes the sensor and the wireless communication circuit (both not illustrated) constituting the sensor node, and the wireless communication circuit performs data transmission by wireless communication at the time of operation will be described as an example.

In step S1, the control unit 50 acquires the detection signal a2 indicating ambient illuminance, the detection signal a2 being output from the environmental sensor 30 (illuminance sensor).

In step S2, the control unit 50 determines whether an illuminance X indicated by the detection signal a2 is higher than a predetermined threshold Y.

When determining that the illuminance X is higher than the threshold Y, the control unit 50 selects the timing signal a3 at a short period and turns on the switch 51 at the timing based on the timing signal a3. For example, in step S3, the control unit 50 determines whether the timing signal a3 has been received. When receiving the timing signal a3, in step S5, the control unit 50 supplies to the switch 51 the control signal a5 for turning on the switch 51.

On the other hand, in step S2, when determining that the illuminance X is lower than the threshold Y, the control unit 50 selects the timing signal a4 at a short period and turns on the switch 51 at the timing based on the timing signal a4. For example, in step S4, the control unit 50 determines whether the timing signal a4 has been received. When receiving the timing signal a4, in step S5, the control unit 50 supplies to the switch 51 the control signal a5 for turning on the switch 51.

When the switch 51 is turned on, the functional unit 60 is connected to the solar cell 11 and operates upon receipt of power supplied from the solar cell 11. When receiving power supplied from the solar cell 11, the functional unit 60 performs processing of transmitting data acquired by the sensor (not illustrated) to the outside from the wireless communication circuit (not illustrated) by wireless communication.

When the processing in the functional unit 60 is completed, the control unit 50 supplies to the switch 51 the control signal a5 for turning off the switch 51 in step S6. When the switch 51 is turned off, the functional unit 60 is disconnected from the solar cell 11 and enters a stopped state (non-operating state). Thereafter, the processing returns to step S1.

According to the control mode by the control unit 50, when the illuminance X indicated by the detection signal a2 is higher than the threshold Y, the switch 51 is turned on each time the timing signal a3 at a short period is received. Therefore, the wireless communication circuit (not illustrated) constituting the functional unit 60 performs data transmission at intervals corresponding to the period T1 of the timing signal a3.

On the other hand, when the illuminance X indicated by the detection signal a2 is lower than the threshold Y, the switch 51 is turned on each time the timing signal a4 at a long period is received. Therefore, the wireless communication circuit (not illustrated) constituting the functional unit 60 performs data transmission at intervals corresponding to the period T2 of the timing signal a4.

As illustrated in FIGS. 1A and 1B, the power generation performance of the solar cell 11 changes according to the ambient environment. However, by detecting the state of the ambient environment by the environmental sensor 30, it is possible to estimate the power generation amount of the solar cell 11 under the relevant environment in real time. According to the power supply control device 1 of the present embodiment, the operation timing of the functional unit 60 is controlled in accordance with the state of the ambient environment detected by the environmental sensor 30. Therefore, the power usage amount in the functional unit 60 may be adapted to the power generation amount of the solar cell 11 under the relevant environment. Therefore, it is possible to avoid inoperability of the functional unit 60 over a long period of time due to power shortage. By using the environmental sensor 30, as compared with the case of detecting the power generation voltage of the solar cell, it is possible to more accurately estimate the amount of power generation in the solar cell 11, the amount of power generation changing depending on the ambient environment. Thus, it is possible to more accurately control the operation timing of the functional unit 60.

As described above, according to the power supply control device 1 of the present embodiment, it is possible to appropriately use the power generated in the power generation unit 10 (solar cell 11).

In the above description, the illuminance sensor is used as the environmental sensor 30 as an example, but the temperature sensor may be used as the environmental sensor 30. In this case, one of the timing signals a3 and a4 is selected depending on whether the temperature indicated by the detection signal a2 output from the temperature sensor is higher than a predetermined threshold. For example, for a temperature at which the amount of generated power in the solar cell 11 relatively increases, the timing signal a3 at a short period is selected, and the functional unit 60 is operated at intervals corresponding to the period T1 of the timing signal a3. On the other hand, for a temperature at which the amount of generated power in the solar cell 11 relatively decreases, the timing signal a4 at a long period is selected, and the functional unit 60 is operated at intervals corresponding to the period T2 of the timing signal a4. The environmental sensor 30 may include an illuminance sensor and a temperature sensor.

In the above description, a mode in which the power generation amount in the solar cell 11 is estimated based on the detection signal a2 output from the environmental sensor 30 and the operation timing of the functional unit 60 is controlled so as to adapt to the estimated power generation amount is exemplified. However, the disclosed technology is not limited to this mode. For example, based on the detection signal a2 output from the environmental sensor 30, an electrostatic capacity of the capacitor 12 in the relevant environment may be estimated and the operation timing of the functional unit 60 may be controlled so as to adapt to the estimated electrostatic capacity.

Second Embodiment

Figure 5:
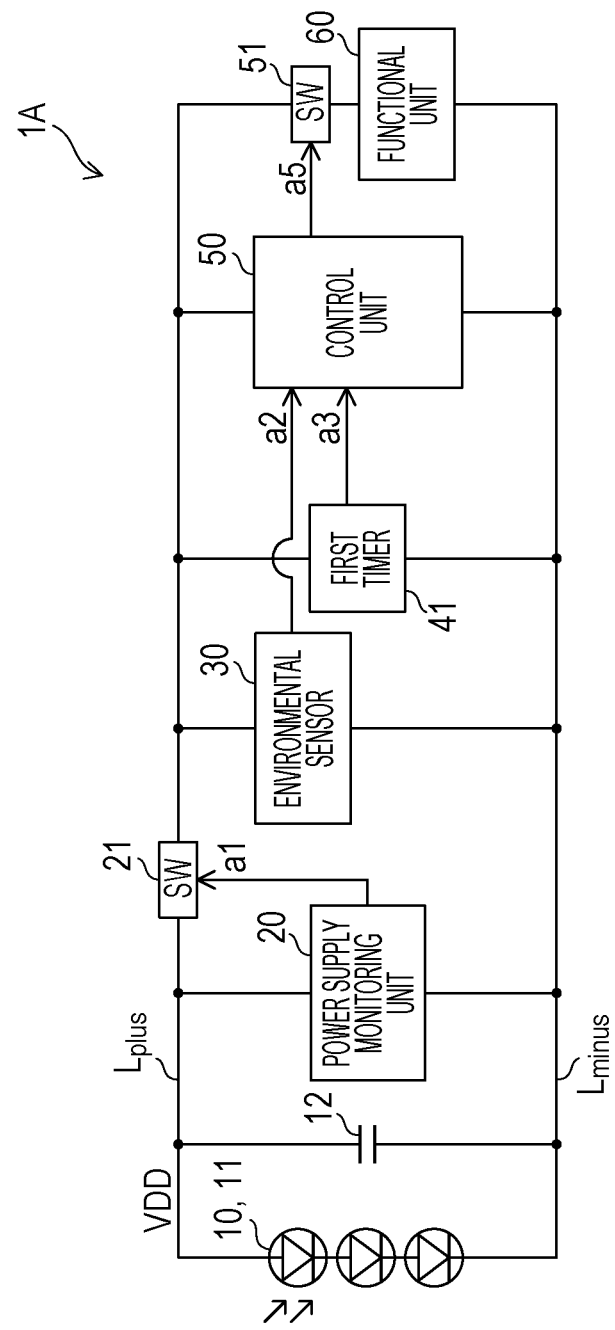
FIG. 5 is a diagram illustrating an example of a configuration of the power supply control device according to the first embodiment of the disclosed technology.

FIG. 5 is a diagram illustrating an example of a configuration of a power supply control device 1A according to a second embodiment of the disclosed technology. The power supply control device 1A is different from the power supply control device 1 (see FIG. 3A) according to the first embodiment in that the power supply control device 1A does not have the second timer 42.

Similarly to the power supply control device 1 according to the first embodiment, the power supply control device 1A operates the functional unit 60 at one of a plurality of mutually different intervals based on the state of the ambient environment detected by the environmental sensor 30. When operating the functional unit 60 at relatively short intervals, the power supply control device 1A turns on the switch 51 at intervals corresponding to the period T1 of the first timer 41. On the other hand, when operating the functional unit 60 at relatively long intervals, the power supply control device 1A turns on the switch 51 at intervals corresponding to N times the period T1 of the timing signal a3 output from the first timer 41.

Figure 6:
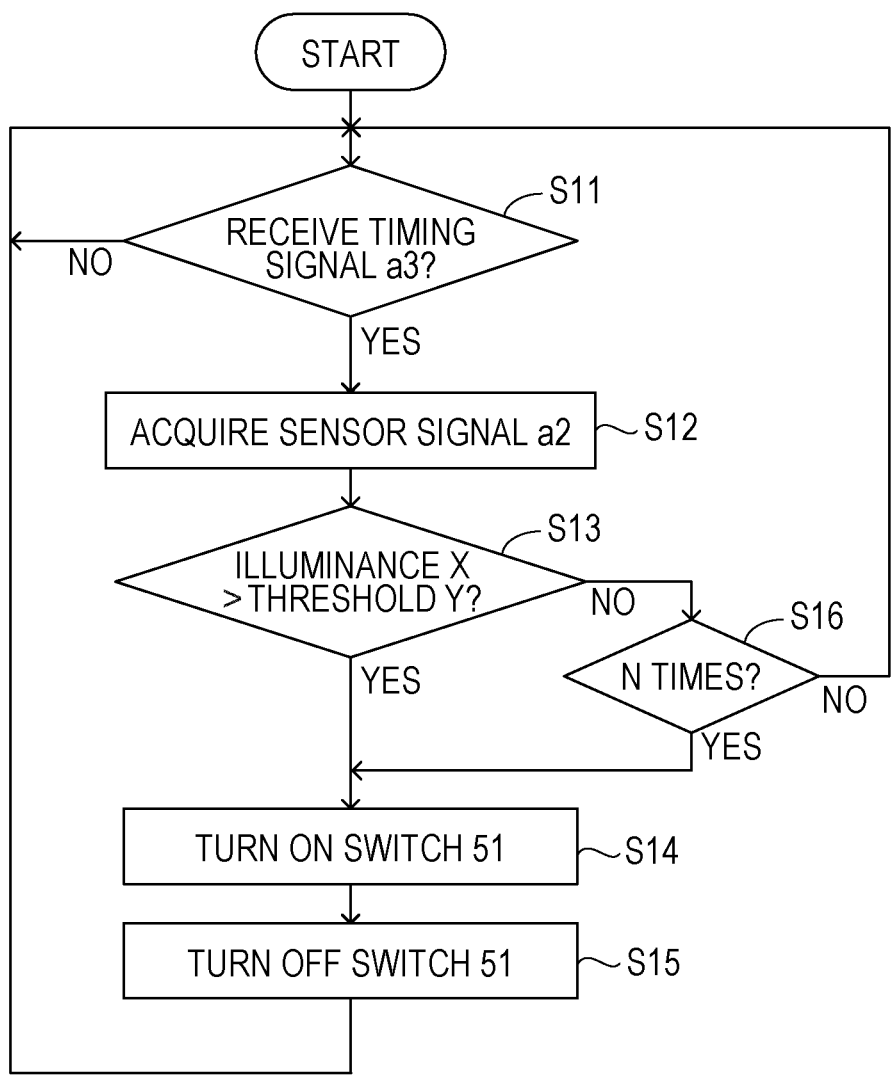
FIG. 6 is a flowchart illustrating an example of a flow of processing performed in a control unit according to a second embodiment of the disclosed technology.

FIG. 6 is a flowchart illustrating an example of a flow of processing performed in the control unit 50 according to the second embodiment of the disclosed technology. Here, a case where the environmental sensor 30 is an illuminance sensor, the functional unit 60 includes the sensor and the wireless communication circuit (both not illustrated) constituting the sensor node, and the wireless communication circuit performs data transmission by wireless communication at the time of operation will be described as an example.

In step S11, the control unit 50 determines whether the timing signal a3 has been received. When receiving the timing signal a3, in step S12, the control unit 50 acquires the detection signal a2 indicating the ambient illuminance output from the environmental sensor 30.

In step S13, the control unit 50 determines whether the illuminance X indicated by the detection signal a2 is higher than the predetermined threshold Y.

When determining that the illuminance X is higher than the threshold Y, the control unit 50 turns on the switch 51 at the timing based on the timing signal a3. For example, the control unit 50 having received the timing signal a3 in step S11 supplies to the switch 51 the control signal a5 for turning on the switch 51 in step S14.

On the other hand, in step S13, when determining that the illuminance X is lower than the threshold Y, the control unit 50 turns on the switch 51 at intervals corresponding to N times the period T1 of the timing signal a3. For example, in step S16, the control unit 50 determines whether the number of times of receiving the timing signal a3 has continuously reached N times. When determining that the number of times of receiving the timing signal a3 has continuously reached N times, in step S14, the control unit 50 supplies the control signal a5 for turning on the switch 51 to the switch 51, and resets the count of the number of times of receiving the timing signal a3.

When the switch 51 is turned on, the functional unit 60 is coupled to the solar cell 11 and operates upon receipt of power supplied from the solar cell 11. When receiving power supplied from the solar cell 11, the functional unit 60 performs processing of transmitting data acquired by the sensor (not illustrated) to the outside from the wireless communication circuit (not illustrated) by wireless communication.

When the processing in the functional unit 60 is completed, the control unit 50 supplies to the switch 51 the control signal a5 for turning off the switch 51 in step S15. When the switch 51 is turned off, the functional unit 60 is disconnected from the solar cell 11 and enters a stopped state (non-operating state). Thereafter, the processing returns to step S11.

According to the control mode by the control unit 50, when the illuminance X indicated by the detection signal a2 is higher than the threshold Y, the switch 51 is turned on each time the timing signal a3 is received. Therefore, the wireless communication circuit (not illustrated) constituting the functional unit 60 performs data transmission at intervals corresponding to the period T1 of the timing signal a3.

On the other hand, when the illuminance X indicated by the detection signal a2 is lower than the threshold Y, the switch 51 is turned on each time the timing signal a3 is continuously received N times. Therefore, the wireless communication circuit (not illustrated) constituting the functional unit 60 performs data transmission at intervals corresponding to N times the period T1 of the timing signal a3.

In this way, by using only the timing signal a3 output from the first timer 41, it is possible to reduce the circuit scale as compared with the power supply control device 1 (FIG. 3A) according to the first embodiment. The power supply control device may include three or more timers. In this case, based on the state of the ambient environment detected by the environmental sensor 30, the control unit 50 selects one of the timing signals output from each of the plurality of timers and operates the functional unit 60 at intervals corresponding to the selected timing signal.

Third Embodiment

Figure 7:
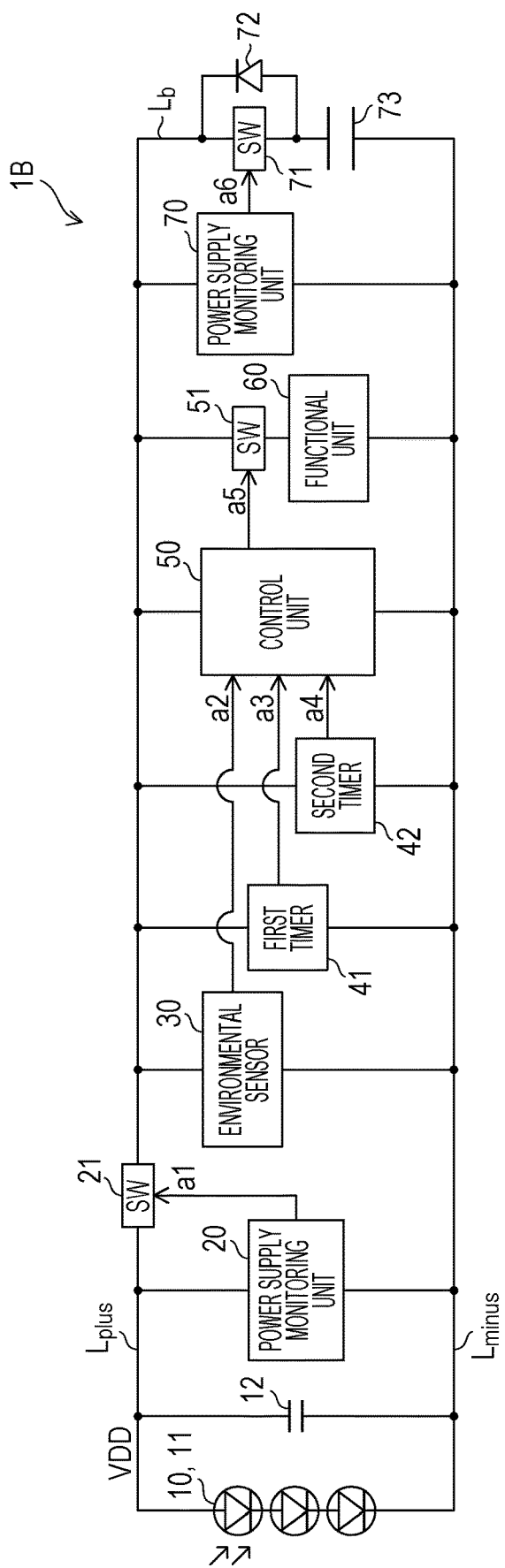
FIG. 7 is a diagram illustrating an example of a configuration of a power supply control device according to a third embodiment of the disclosed technology.

FIG. 7 is a diagram illustrating an example of a configuration of a power supply control device 1B according to a third embodiment of the disclosed technology. The power supply control device 1B is different from the power supply control device 1 (see FIG. 3A) according to the first embodiment in that the power supply control device 1B further includes a power supply monitoring unit 70, a switch 71, a diode 72, and a power storage unit 73. In the case where the switch 71 includes, for example, a metal-oxide-semiconductor field-effect transistor (MOSFET), the diode 72 may be a parasitic diode associated with this MOSFET.

Each of the power storage unit 73 and the switch 71 is provided on a branch line $L_b$ when coupled to the power supply lines $L_{plus}$ and $L_{minus}$. The branch line $L_b$ has one end coupled to the power supply line $L_{plus}$ on the load side and the other end coupled to the power supply line $L_{minus}$. For example, a series circuit including the switch 71 and the power storage unit 73 is coupled in parallel to the solar cell 11.

The power storage unit 73 is configured by a storage element having a larger storage capacity than the capacitor 12 such as a secondary battery, a super capacitor, or the like. When both of the switch 21 and the switch 71 are turned on, the power storage unit 73 is coupled to the solar cell 11, and charging is performed in the power storage unit 73.

The switch 71 is turned on or off in accordance with a control signal a6 supplied from the power supply monitoring unit 70. The diode 72 is coupled in parallel to the switch 71. For example, the diode 72 has an anode coupled to a positive electrode of the power storage unit 73, and a cathode coupled to the power supply line $L_{plus}$ on the load side.

The power supply monitoring unit 70 controls on/off of the switch 71 based on the level of the voltage VDD generated between the power supply line $L_{plus}$ on the load side and the power supply line $L_{minus}$. When the level of the voltage VDD exceeds the level of a threshold voltage VH2, the power supply monitoring unit 70 outputs the control signal a6 for turning on the switch 71. The level of the threshold voltage VH2 is set to a level higher than the level of the threshold voltage VL1 in the power supply monitoring unit 20. On the other hand, when the level of the voltage VDD is lower than the level of a threshold voltage VL2 (<VH2), the power supply monitoring unit 70 outputs the control signal a6 for turning off the switch 71.

The operation of the power supply control device 1B will be described below. In the initial state, it is assumed that the switches 21 and 51 are turned off.

When the solar cell 11 is irradiated with light, power is generated in the solar cell 11. The power generated by the solar cell 11 is accumulated in the capacitor 12. As the illuminance of the light applied to the solar cell 11 increases, the generated voltage (charging voltage of the capacitor 12) output from the solar cell 11 increases and the voltage VDD generated in the power supply lines $L_{plus}$ and $L_{minus}$ increases. When detecting that the level of the voltage VDD exceeds the level of the threshold voltage VH1, the power supply monitoring unit 20 outputs the control signal at for turning on the switch 21. As a result, the switch 21 is turned on, power is supplied to the environmental sensor 30, the first timer 41, the second timer 42, and the control unit 50, and each of these blocks starts operating. Similarly to the power supply control device 1 according to the first embodiment, the control unit 50 controls the operation timing of the functional unit 60 based on the state of the ambient environment detected by the environmental sensor 30.

When detecting that the level of the voltage VDD exceeds the level of the threshold voltage VH2 (>VL1), the power supply monitoring unit 70 outputs the control signal a6 for turning on the switch 71. As a result, the switch 71 is turned on. When both of the switch 21 and the switch 71 are turned on, the power storage unit 73 is coupled to the solar cell 11 and the capacitor 12, and is charged with power generated by the solar cell 11.

Since the power storage unit 73 has a larger storage capacity than the capacitor 12, the level of the voltage VDD lowers as an electric charge moves from the capacitor 12 to the power storage unit 73. When detecting that the level of the voltage VDD is lower than the level of the threshold voltage VL2 (<VH2), the power supply monitoring unit 70 outputs the control signal a6 for turning off the switch 71. When the switch 71 is turned off, the power storage unit 73 is disconnected from the solar cell 11 and the capacitor 12. In the case where the power generation amount in the solar cell 11 is relatively large, when the switch 71 is turned off, the level of the voltage VDD increases again. As a result, the switch 71 repeats the on/off operation.

While the on/off operation is repeated in the switch 71, the charging voltage of the power storage unit 73 gradually increases. When the amount of power generation in the solar cell 11 is relatively large, as long as the charging voltage of the power storage unit 73 does not exceed the threshold voltage VL2, the on/off operation in the switch 71 continues. By repeating the on/off operation in the switch 71, charging of the power storage unit 73 is performed intermittently.

When the intensity of light applied to the solar cell 11 decreases, the power generation amount per unit time of the solar cell 11 decreases, and the level of the voltage VDD decreases.

When detecting that the level of the voltage VDD is lower than the level of the threshold voltage VL1, the power supply monitoring unit 20 outputs the control signal a1 for turning off the switch 21. As a result, the switch 21 is turned off. Since the power storage unit 73 is intermittently charged, the power supply monitoring unit 20 may detect the level of the voltage VDD corresponding to the power generation voltage of the solar cell 11 without being affected by the charging voltage of the power storage unit 73. When the switch 21 is turned off, power supply from the solar cell 11 to each block (the environmental sensor 30, the first timer 41, the second timer 42, the control unit 50, the functional unit 60, and the power supply monitoring unit 70) is blocked.

Similarly, when detecting that the level of the voltage VDD is lower than the level of the threshold voltage VL2, the power supply monitoring unit 70 outputs the control signal a6 for turning off the switch 71. As a result, the switch 71 is turned off. The power accumulated in the power storage unit 73 is supplied to each block (the environmental sensor 30, the first timer 41, the second timer 42, the control unit 50, the functional unit 60, and the power supply monitoring unit 70) via the diode 72. In some cases, the power supply monitoring unit 70 turns on the switch 71 that is SW, again according to the supplied level.

As described above, according to the power supply control device 1B according to the present embodiment, even when power generation by the solar cell 11 is stopped such as at night, each of the above-mentioned blocks (the environmental sensor 30, the first timer 41, the second timer 42, the control unit 50, the functional unit 60, and the power supply monitoring unit 70) may be operated by the power accumulated in the power storage unit 73.

In the above description, a mode in which the power generation amount in the solar cell 11 is estimated based on the detection signal a2 output from the environmental sensor 30 and the operation timing of the functional unit 60 is controlled so as to adapt to the estimated power generation amount is exemplified. However, the disclosed technology is not limited to this mode. For example, the storage performance (electrostatic capacity) of the power storage unit 73 may be estimated based on the detection signal a2 output from the environmental sensor 30, and the operation timing of the functional unit 60 may be controlled so as to adapt to the estimated storage performance.

Fourth Embodiment

Figure 8:
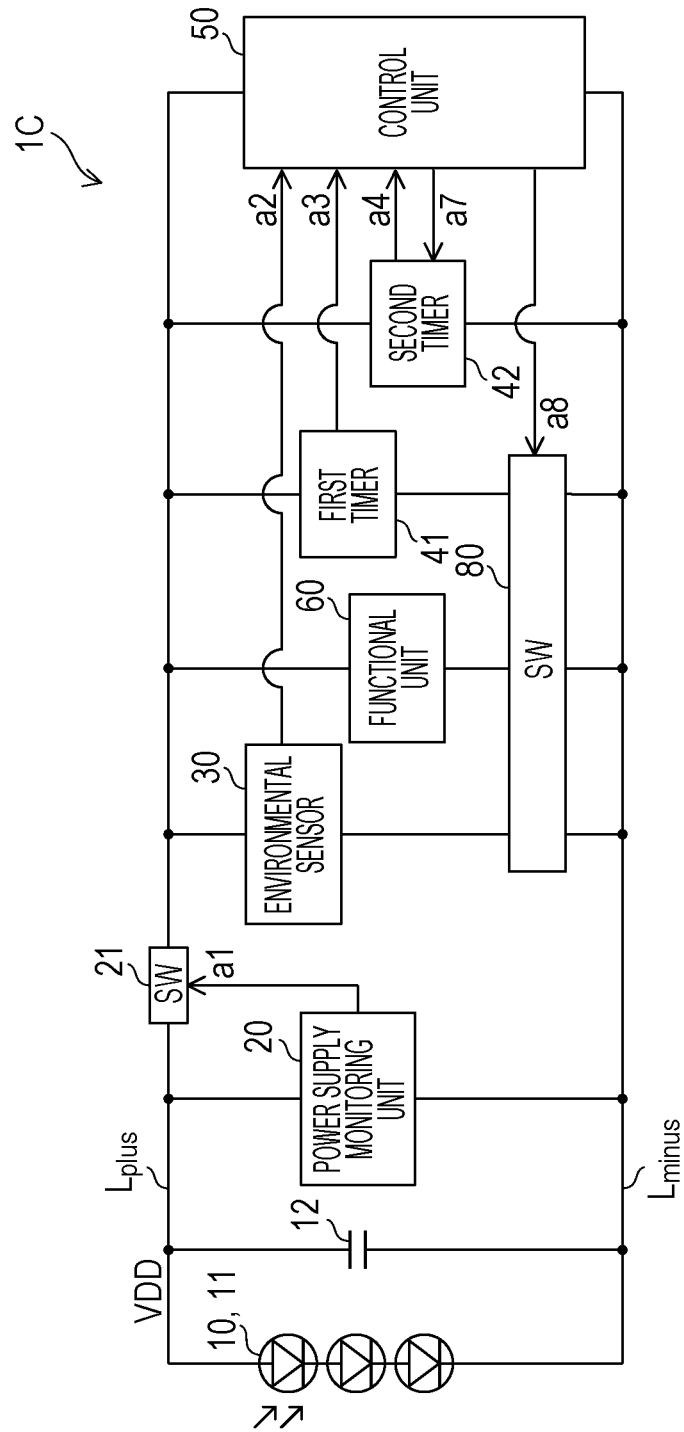
FIG. 8 is a diagram illustrating an example of a configuration of a power supply control device according to a fourth embodiment of the disclosed technology.

FIG. 8 is a diagram illustrating an example of a configuration of a power supply control device 1C according to a fourth embodiment of the disclosed technology. The power supply control device 1C is different from the power supply control device 1 (see FIG. 3A) according to the first embodiment in that the power supply control device 1C includes a switch 80.

The switch 80 is provided on each power supply path for supplying power to the environmental sensor 30, the first timer 41, and the functional unit 60. The switch 80 is turned on or off in accordance with a control signal a8 supplied from the control unit 50. Each of the environmental sensor 30, the first timer 41, and the functional unit 60 is coupled to the solar cell 11 when both of the switches 21 and 80 are turned on, and is activated upon receipt of power supplied from the solar cell 11.

Figure 9:
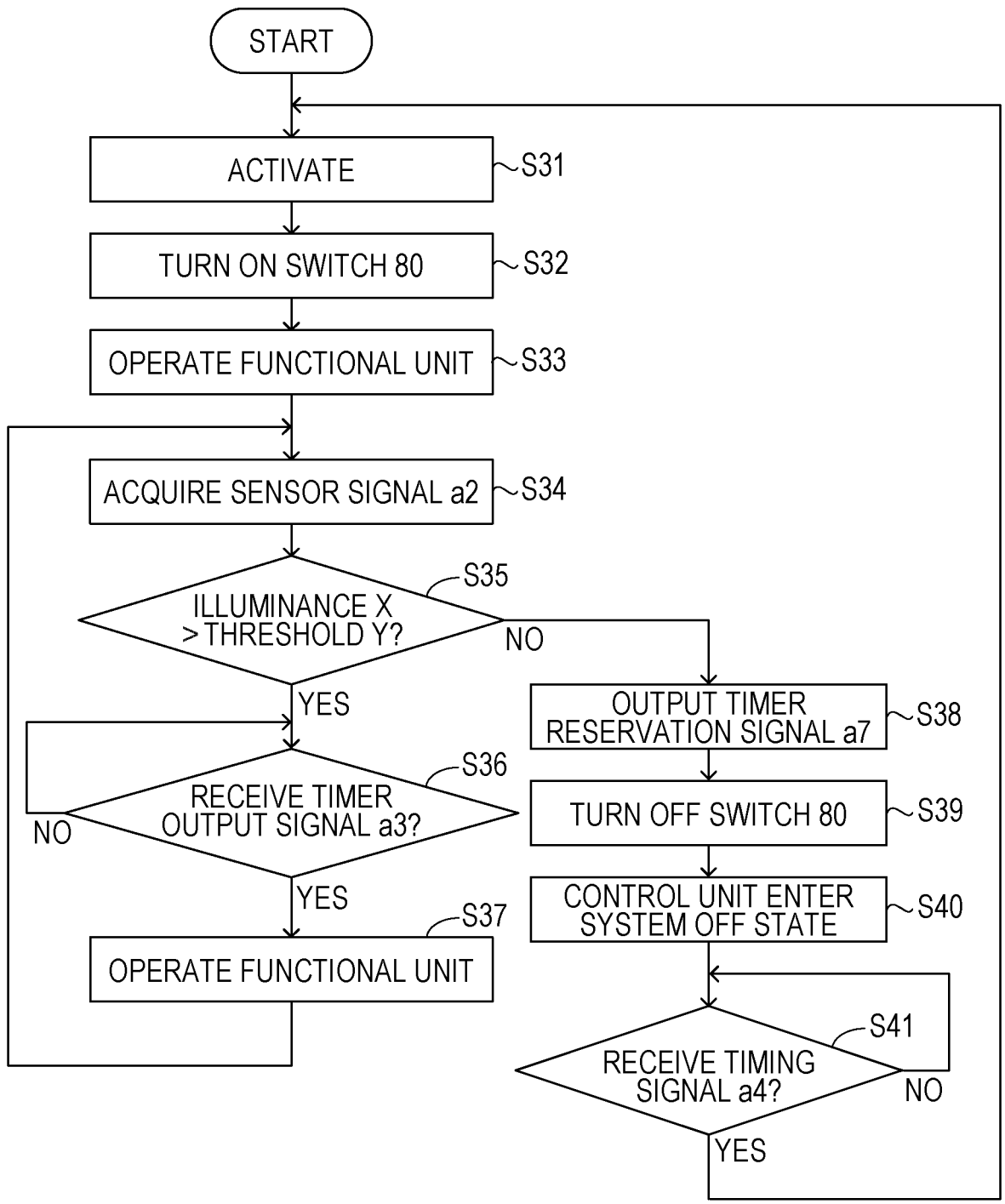
FIG. 9 is a flowchart illustrating an example of a flow of processing performed in a control unit according to a fourth embodiment of the disclosed technology.

FIG. 9 is a flowchart illustrating an example of a flow of processing performed in the control unit 50 according to a fourth embodiment of the disclosed technology. Here, a case where the environmental sensor 30 is an illuminance sensor, the functional unit 60 includes a sensor and a wireless communication circuit (both not illustrated) constituting a sensor node, and the wireless communication circuit performs data transmission by wireless communication at the time of operation will be described as an example. Furthermore, in the initial state, it is assumed that the switches 21 and 80 are turned off.

When the level of the voltage VDD generated in the power supply lines $L_{plus}$ and $L_{minus}$ exceeds the level of the threshold voltage VH1, the switch 21 is turned on. When the switch 21 is turned on, the control unit 50 is activated (step S31).

In step S32, the control unit 50 outputs the control signal a8 for turning on the switch 80. When the switch 80 is turned on, the environmental sensor 30, the first timer 41, and the functional unit 60 are activated. At the time of activation, the functional unit 60 performs a predetermined initial setting.

The control unit 50 supplies a control signal instructing the functional unit 60 to operate in step S33. As a result, the functional unit 60 performs processing of transmitting data acquired by the sensor (not illustrated) to the outside from the wireless communication circuit (not illustrated) by wireless communication.

In step S34, the control unit 50 acquires the detection signal a2 indicating ambient illuminance, the detection signal a2 being output from the environmental sensor 30.

In step S35, the control unit 50 determines whether the illuminance X indicated by the detection signal a2 is higher than the predetermined threshold Y.

When determining that the illuminance X is higher than the threshold Y, the control unit 50 determines in step S36 whether the timing signal a3 has been received. When receiving the timing signal a3, in step S37, the control unit 50 supplies a control signal instructing the functional unit 60 to operate. As a result, the functional unit 60 performs processing of transmitting data acquired by the sensor (not illustrated) to the outside from the wireless communication circuit (not illustrated) by wireless communication. Thereafter, the processing returns to step S34.

On the other hand, when determining that the illuminance X is lower than the threshold Y in step S35, the control unit 50 supplies a timer reservation signal a7 to the second timer 42 in step S38.

In step S39, the control unit 50 outputs the control signal a8 for turning off the switch 80. As a result, the switch 80 is turned off, and power supply to the environmental sensor 30, the first timer 41, and the functional unit 60 is stopped. For example, the functional unit 60 enters a system off state in which power is not consumed.

In step S40, the control unit 50 itself also enters the system off state. On the other hand, the second timer 42 maintains an operating state. The second timer 42 supplies the timing signal a4 to the control unit 50 when a period corresponding to the period T2 has elapsed from the time when the timer reservation signal a7 is received.

When the control unit 50 receives the timing signal a4 output from the second timer 42 (step S41: affirmative determination), the processing returns to step S31 and the control unit 50 is reactivated.

According to the power supply control device 1C according to the present embodiment, when the illuminance X is maintained higher than the threshold Y (when the amount of power generation per unit time in the solar cell 11 is relatively large), the processing from step S34 to step S37 is repeated. Therefore, the functional unit 60 performs data transmission at intervals corresponding to the period T1 of the timing signal a3. In this case, the switch 80 maintains an ON state. The functional unit 60 enters a standby state in which power is consumed, at the time of non-operation where data transmission is not performed. When the functional unit 60 shifts from the standby state to the operating state, the initial setting performed at the time of activation of the functional unit 60 is not executed.

On the other hand, when the illuminance X is kept lower than the threshold Y (when the amount of power generation per unit time in the solar cell 11 is relatively small), the functional unit 60 performs data transmission processing after the activation, and thereafter, the functional unit 60 and the control unit 50 both enter the system off state. Thereafter, the functional unit 60 and the control unit 50 are reactivated at the timing based on the timing signal a4. Therefore, in this case, the functional unit 60 performs data transmission at intervals corresponding to the period T2 of the timing signal a4.

Power consumed by the functional unit 60 when the functional unit 60 repeats the standby state and the operating state will be considered. In the standby state, power is consumed for reasons such as necessity of holding information held in a memory (not illustrated) constituting the functional unit 60. As an operating interval (data transmission interval) of the functional unit 60 becomes longer, power consumption per one piece of processing increases.

Next, power consumed by the functional unit 60 when the functional unit 60 repeats the system off state and the operating state will be considered. The power consumption of the functional unit 60 in the system off state is substantially zero. However, when the functional unit 60 returns from the system off state and is reactivated, the predetermined initial setting is performed. In this initial setting, a certain amount of power is consumed and time is taken. On the other hand, when shifting the functional unit 60 from the standby state to the operating state, the initial setting is not required.

Taking these circumstances into consideration, when the operating interval (data transmission interval) of the functional unit 60 is relatively short, it is thought to be preferable to set a state of the functional unit 60 at the time of non-operation to the standby state in which reactivation is not required and power is consumed, to avoid power consumption due to reactivation. On the other hand, when the operating interval (data transmission interval) of the functional unit 60 is relatively long, it is thought to be preferable to set a state of the functional unit 60 at the time of non-operation to the system off state in which reactivation is required and power is not consumed, to avoid power consumption in a non-operating period.

According to the power supply control device 1C according to the present embodiment, when the functional unit 60 operates at relatively short intervals corresponding to the period T1 of the timing signal a3, a state of the functional unit 60 at the time of non-operation is set to the standby state in which reactivation is not required and power is consumed. When the functional unit 60 operates at relatively long intervals corresponding to the period T2 of the timing signal a4, a state of the functional unit 60 at the time of non-operation is set to the system off state in which reactivation is required and power is not consumed. In this manner, by switching the state of the functional unit 60 at the time of non-operation according to the operating interval of the functional unit 60, the power consumption in the functional unit 60 may be suppressed, and more preferable use control of power may be realized.

Fifth Embodiment

Figure 10:
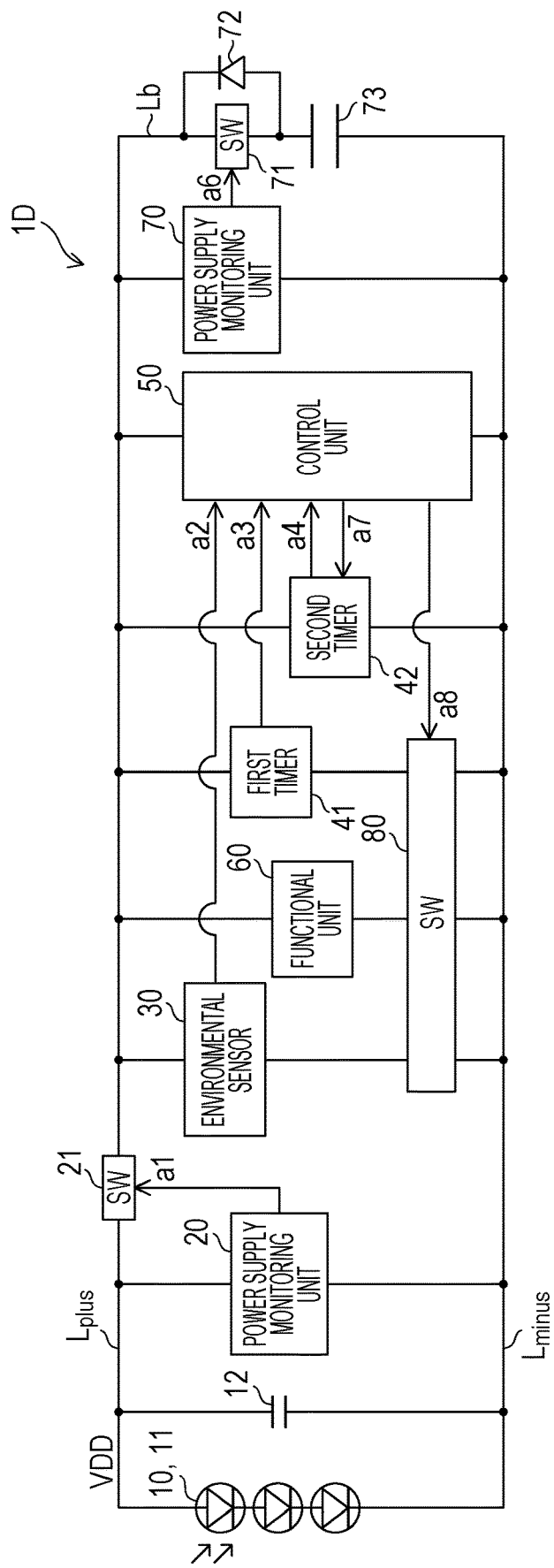
FIG. 10 is a diagram illustrating an example of a configuration of a power supply control device according to a fifth embodiment of the disclosed technology.

FIG. 10 is a diagram illustrating an example of a configuration of a power supply control device 1D according to a fifth embodiment of the disclosed technology. The power supply control device 1D is different from the power supply control device 1C (see FIG. 8) according to the fourth embodiment in that the power supply control device 1D further includes the power supply monitoring unit 70, the switch 71, the diode 72, and the power storage unit 73.

The power supply monitoring unit 70, the switch 71, the diode 72, and the power storage unit 73 are the same as those of the power supply control device 1B according to the third embodiment (see FIG. 7), so that duplicate descriptions are omitted.

According to the power supply control device 1D according to the present embodiment, similarly to the power supply control device 1B according to the third embodiment, even when power generation by the solar cell 11 is stopped such as at night, each of the above-mentioned blocks (the environmental sensor 30, the first timer 41, the second timer 42, the control unit 50, the functional unit 60, and the power supply monitoring unit 70) may be operated by the power accumulated in the power storage unit 73. According to the power supply control device 1D according to the present embodiment, similarly to the power supply control device 1C according to the fourth embodiment, since the state of the functional unit 60 at the time of non-operation is switched according to the operating interval of the functional unit 60, power consumption in the functional unit 60 may be suppressed. Thus, since the electrostatic capacity of the power storage unit 73 may be reduced, the size of the power storage unit 73 may be reduced, and the time for charging the power storage unit 73 may be shortened.

Sixth Embodiment

Figure 11:
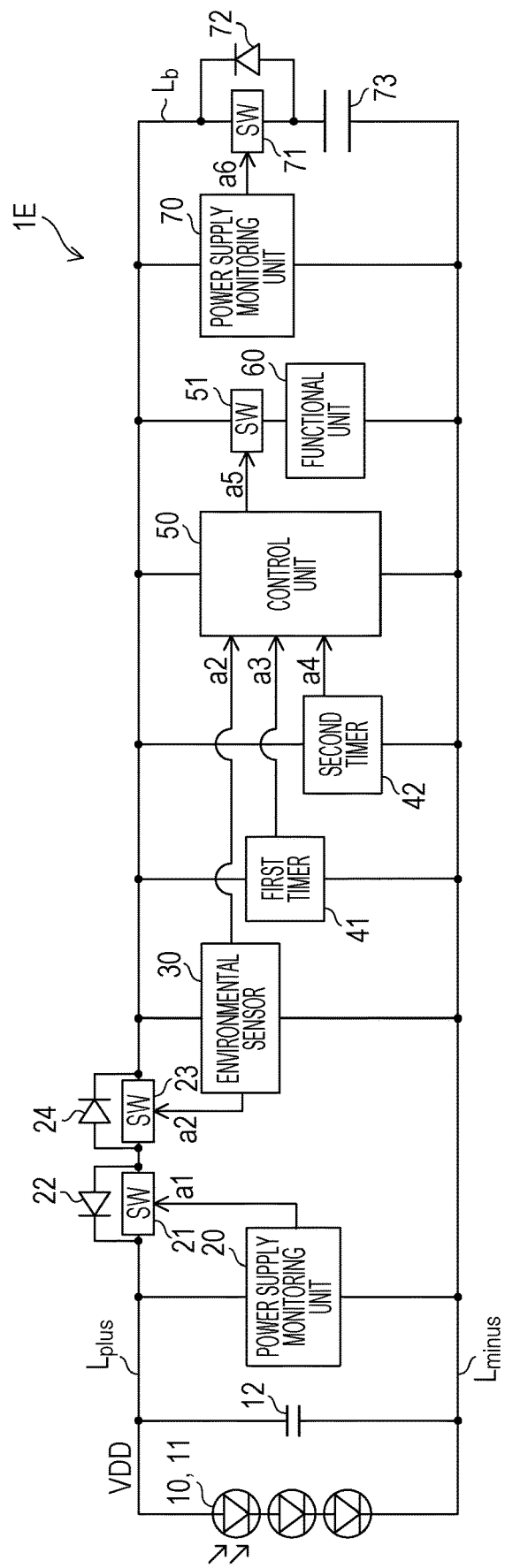
FIG. 11 is a diagram illustrating an example of a configuration of a power supply control device according to a sixth embodiment of the disclosed technology.

FIG. 11 is a diagram illustrating an example of a configuration of a power supply control device 1E according to a sixth embodiment of the disclosed technology. The power supply control device 1E is different from the power supply control device 1B (see FIG. 7) according to the third embodiment in that the power supply control device 1E includes a switch 23 and diodes 22 and 24.

The diode 22 is coupled in parallel to the switch 21. In the case where the switch 21 includes, for example, a metal-oxide-semiconductor field-effect transistor (MOSFET), the diode 22 may be a parasitic diode associated with this MOSFET.

The switch 23 is provided on the power supply line $L_{plus}$ and is coupled in series with the switch 21. The switch 23 is turned on or off in accordance with the detection signal a2 supplied from the environmental sensor 30. For example, the switch 23 is turned on and off based on the state of the ambient environment detected by the environmental sensor 30. In the case where the environmental sensor 30 is, for example, an illuminance sensor, when the ambient illuminance indicated by the detection signal a2 is equal to or lower than a predetermined value (for example, when it is estimated that the power generation amount in the solar cell 11 has become substantially zero), the switch 23 is turned off.

The diode 24 is coupled in parallel to the switch 23 so as to face in a direction reverse to a direction of the diode 22. If the switch 23 includes, for example, a MOSFET, the diode 24 may be a parasitic diode associated with this MOSFET. At least one of the switch 23 and the diode 24 may be provided on the power supply line $L_{minus}$.

According to the power supply control device 1E according to the present embodiment, the switch 23 may be turned on and off in accordance with the power generation amount of the solar cell 11. For example, by turning off the switch 23 when there is no power generation in the solar cell 11, it is possible to avoid that the power accumulated in the power storage unit 73 is consumed by the solar cell 11.

In the case where there is no power generation in the solar cell 11, when the switch 23 and the diode 24 are not provided, a backflow may occur in which a current from the power storage unit 73 flows into the solar cell 11 via the diode 22. According to the power supply control device 1E according to the present embodiment, the diode 24 facing in the direction reverse to the direction of the diode 22 may avoid a backflow of the current.

Seventh Embodiment

Figure 12:
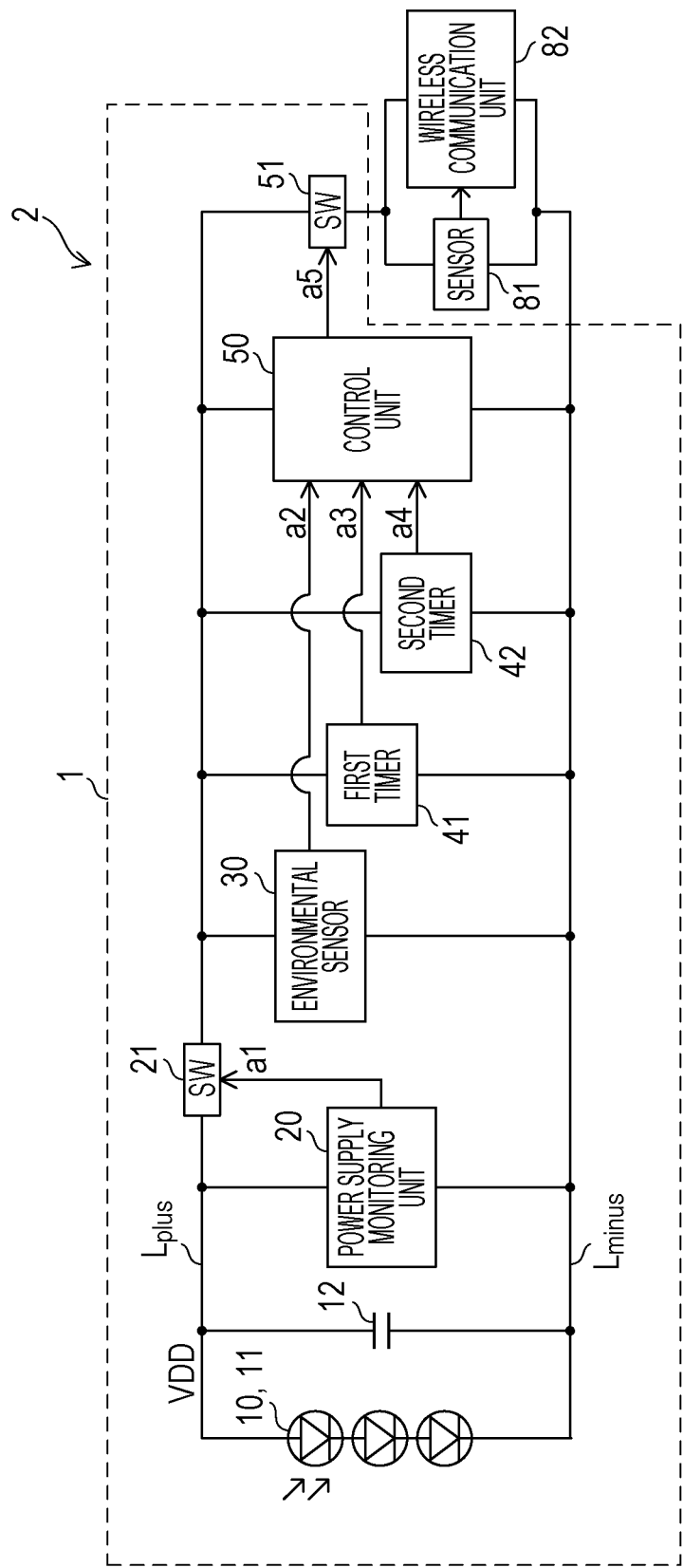
FIG. 12 is a diagram illustrating an example of a configuration of a communication device according to a seventh embodiment of the disclosed technology.

FIG. 12 is a diagram illustrating a configuration of a communication device 2 according to a seventh embodiment of the disclosed technology. The communication device 2 includes the power supply control device 1, and a sensor 81 and a wireless communication unit 82 which operate upon receipt of power supplied from the power supply control device 1. For example, the sensor 81 and the wireless communication unit 82 correspond to the functional unit 60 illustrated in FIG. 3A or the like. When both of the switch 21 and the switch 51 are turned on, the sensor 81 and the wireless communication unit 82 operate upon reception of power supplied from the power supply control device 1.

For the sensor 81, for example, any sensor such as a temperature sensor, a humidity sensor, an illuminance sensor, a voltage sensor, or the like may be applied. The wireless communication unit 82 has a function of transmitting data acquired by the sensor 81 to the outside by wireless communication. The communication device 2 may constitute a sensor node in a sensor network. The communication device 2 may include any one of the power supply control devices 1A, 1B, 1C, 1D, and 1E instead of the power supply control device 1.

The power supply control devices 1, 1A, 1B, 1C, 1D, and 1E are an example of a power supply control device in the disclosed technology. The communication device 2 is an example of a communication device in the disclosed technology. The power generation unit 10 is an example of a power generation unit in the disclosed technology. The solar cell 11 is an example of a solar cell in the disclosed technology. The power supply monitoring unit 20 is an example of a power supply monitoring unit and a first power supply monitoring unit in the disclosed technology. The power supply monitoring unit 70 is an example of a second power supply monitoring unit in the disclosed technology. The switches 51 and 80 are an example of a first switch in the disclosed technology. The switch 21 is an example of a second switch in the disclosed technology. The switch 71 is an example of a third switch in the disclosed technology. The switch 23 is an example of a fourth switch in the disclosed technology. The environmental sensor 30 is an example of an environmental sensor in the disclosed technology. The timer 41 is an example of a first timer in the disclosed technology. The timer 42 is an example of a second timer in the disclosed technology. The control unit 50 is an example of a control unit in the disclosed technology. The functional unit 60 is an example of a functional unit in the disclosed technology. The power storage unit 73 is an example of a power storage unit in the disclosed technology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device comprising:
    a power generator that converts energy into power;
    an environmental sensor that detects a state of an ambient environment;
    a wireless communication circuit that operates upon receipt of power supplied from the power generator; and
    a controller that controls a transmission interval of data which is transmitted from the wireless communication circuit based on the state of the ambient environment detected by the environment sensor,
    wherein the power generator includes a solar cell, the environmental sensor includes an illuminance sensor, and the controller sets an operating interval of the wireless communication circuit in a case where an illuminance detected by the illuminance sensor is lower than a threshold to be longer than an operating interval of the wireless communication circuit in a case where an illuminance detected by the illumination sensor is higher than the threshold.

2. The communication device according to claim 1, further comprising at least one timer that outputs a timing signal of a fixed period, wherein the controller operates the wireless communication circuit at intervals corresponding to a period of the timing signal selected based on the state of the ambient environment detected by the environmental sensor, each of the intervals being one of a plurality of mutually different intervals.

3. The communication device according to claim 1, further comprising a plurality of timers that output timing signals at different periods, wherein the controller selects one of the timing signals output from each of the plurality of timers based on the state of the ambient environment detected by the environmental sensor, and operates the wireless communication circuit at intervals corresponding to the period of the selected timing signal.

4. The communication device according to claim 1, wherein in a case where the wireless communication circuit is operated at a first interval, the controller sets a state of the wireless communication circuit at a time of non-operation to a standby state in which reactivation is not performed and power is consumed, and in a case where the wireless communication circuit is operated at a second interval longer than the first interval, the controller sets the state of the wireless communication circuit at the time of non-operation to a system off state in which reactivation is performed and power is not consumed.

5. The communication device according to claim 4, wherein in the case where the wireless communication circuit is operated at the second interval, the controller enters the system off state after setting the state of the wireless communication circuit at the time of non-operation to the system off state, and reactivates the wireless communication circuit after being reactivated based on a timing signal corresponding to the second interval.

6. The communication device according to claim 1, further comprising a first switch provided on a power supply path configured to supply power to the wireless communication circuit, wherein the controller controls an operation timing of the wireless communication circuit by controlling on and off of the first switch.

7. The communication device according to claim 6, further comprising:
    a capacitor coupled in parallel to the power generator;
    a second switch provided on at least one of a pair of power supply lines to which a generated voltage output from the power generator is applied;
    a first power supply monitor that controls the second switch based on a voltage generated in the pair of power supply lines;
    a third switch provided on a branch line coupled to the pair of power supply lines;
    a second power supply monitor that controls the third switch based on a level of a voltage generated in the pair of power supply lines; and
    a power storage, provided on the branch line, that is coupled and to the power generator when the second switch and the third switch are both turned on; wherein the controller is coupled to the power generator when the second switch is turned on, and coupled to the power storage when the third switch is turned on, the wireless communication circuit is coupled to the power generator when the first switch and the second switch are both turned on, and coupled to the power storage when the first switch and the third switch are both turned on.

8. The communication device according to claim 7, further comprising:
    a first diode coupled in parallel to the second switch;
    a fourth switch that is provided on one of the pair of power supply lines and is turned on and off based on the state of the ambient environment detected by the environmental sensor; and
    a second diode coupled in parallel to the fourth switch so as to face in a direction reverse to a direction of the first diode.

9. The communication device according to claim 1, wherein the environmental sensor includes at least one of an illuminance sensor and a temperature sensor.

* * * * *